US008449231B2

(12) United States Patent
Tedeschi et al.

(10) Patent No.: US 8,449,231 B2
(45) Date of Patent: May 28, 2013

(54) MILLING CUTTER FOR DRESSING RESISTANCE WELDING ELECTRODES

(75) Inventors: Eugenio Tedeschi, Turin (IT); Anselmo Grilli, Turin (IT)

(73) Assignee: Sinterleghe S.r.l., Turin (IT)

( * ) Notice: Subject to any disclaimer, the term of this patent is extended or adjusted under 35 U.S.C. 154(b) by 689 days.

(21) Appl. No.: 12/667,225

(22) PCT Filed: Jun. 27, 2008

(86) PCT No.: PCT/IB2008/052587
§ 371 (c)(1),
(2), (4) Date: Dec. 29, 2009

(87) PCT Pub. No.: WO2009/004546
PCT Pub. Date: Jan. 8, 2009

(65) Prior Publication Data

US 2010/0196115 A1 Aug. 5, 2010

(30) Foreign Application Priority Data

Jun. 29, 2007 (IT) .............................. TO2007A0469

(51) Int. Cl.
*B23C 3/12* (2006.01)

(52) U.S. Cl.
CPC ....................................... *B23C 3/12* (2013.01)
USPC ................................ 409/140; 407/42; 407/61

(58) Field of Classification Search
USPC .................. 409/140, 139; 407/61, 42, 48, 60
IPC .......................................................... B23C 3/12
See application file for complete search history.

(56) References Cited

U.S. PATENT DOCUMENTS

| | | | | |
|---|---|---|---|---|
| 2,418,767 | A * | 4/1947 | Hall | 408/211 |
| 4,762,446 | A | 8/1988 | Nishiwaki | |
| 2005/0238445 | A1 | 10/2005 | Johansson et al. | |

FOREIGN PATENT DOCUMENTS

| | | | |
|---|---|---|---|
| EP | 0 844 040 | A1 | 5/1998 |
| EP | 1 629 914 | A2 | 3/2006 |

OTHER PUBLICATIONS

English translation of EP 0844040A1, obtained at www.worldwide.espacenet.com, dated Nov. 13, 1997.*

* cited by examiner

*Primary Examiner* — Daniel Howell
*Assistant Examiner* — Alan Snyder
(74) *Attorney, Agent, or Firm* — Merchant & Gould P.C.

(57) ABSTRACT

The milling cutter includes blades each having a cutting edge and a rear face. The cutting edges extend radially outwards from a longitudinal axis so as to create, during the rotation of the milling cutter, one or two concave surfaces for receiving the ends of one or two electrodes. The rear face has a concave profile in a section plane perpendicular to the cutting edge.

6 Claims, 4 Drawing Sheets

12
14
10
20
14
21
12
12
14

R
P
B
A
11
12
14
h

MILLING CUTTER FOR DRESSING RESISTANCE WELDING ELECTRODES

This application is a National Stage Application of PCT/IB2008/052587, filed 27 Jun. 2008, which claims benefit of Serial No. TO2007A000469, filed 29 Jun. 2007 in Italy and which applications are incorporated herein by reference. To the extent appropriate, a claim of priority is made to each of the above disclosed applications.

BACKGROUND OF THE INVENTION

The present invention relates to a milling cutter for dressing resistance welding electrodes.

It is known that, in spot-welding plants, the electrodes of the welding guns wear, become contaminated and deform with use; the correct shape and clean state of the electrodes therefore has to be re-established frequently by dressing means with milling cutters. Dressing of the electrodes has improved the performance of production plants since electrode life has been lengthened; the geometric shape and quality of the spot-weld obtained has been regularized and improved.

As is known, particularly in the car-manufacturing field, resistance spot-welds are performed by welding guns that are mounted on robotized arms. Each gun has two opposable electrodes of generally convex and cylindrical external shape. The electrodes wear and are deformed with use. Typically, a crater forms on the front face or "lens" of the electrode, resulting in the formation of an air pocket which reduces electrical conductivity and prevents correct geometrical contact between the electrode and the sheet metal to be welded. Welds performed with an electrode in these conditions are of poor quality, have an annular or asymmetric imprint, and are weak. hi other cases, the end of the electrode adopts a mushroom shape due to zinc deposits and deformation. When an electrode thus deformed is moved away from the sheet metal that has just been welded, it leaves an imprint the edge of which bears visible and undesirable signs of "tearing". Moreover, the enlargement of the free end of the electrode leads to a reduction in current density and in the pressure exerted by the welding gun. An increase in diameter of from 6 to 7 mm corresponds to a 36% increase in contact surface area (from 26 to 38 $mm^2$). This means that, in some cases, a given current supplied to the welding gun will not permit correct fusion of the sheet metal because of the enlargement of the contact surface and the consequent reduction in current density.

Poor quality of the electrode material inevitably leads to welds of inadequate quality. The electrodes are therefore dressed periodically to re-establish their correct shape; when they are worn out they have to be replaced. To dress the electrodes, the welding robot periodically brings its gun into the vicinity of a dressing head that is provided with its own electric or pneumatic motor which sets a biconcave milling cutter in rotation, and introduces the electrodes into the opposed recesses.

A biconcave milling cutter for resistance-welding electrodes comprising a plurality of blades projecting radially outwards from a longitudinal central axis of the milling cutter is known from U.S. Pat. No. 4,762,446. The blades have cutting edges that are spaced angularly at regular intervals about the axis, with flat rear faces and cooperate, during rotation about the above-mentioned axis, so as to define two opposed, domed recesses each suitable for receiving the end of a respective electrode of a welding gun.

Milling cutters of the above-mentioned type have a disadvantage owing to the fact that they tend to remove variable amounts of material from the electrode, according to the hardness of the electrode and the pressure with which the welding gun presses the electrodes into the milling cutter. Too much copper is removed from the electrode when the electrode is quite soft. Pressure transmitted by the welding gun causes the cutting edges of the milling cutter to penetrate too far into the electrode and, in some cases, the milling cutter jams.

SUMMARY OF THE INVENTION

The object of the invention is to provide a milling cutter which can overcome the disadvantages discussed above and ensure controlled penetration of the cutting edges which is constant over time and independent of the pressure of the welding gun and of the metallographic characteristics of the electrodes. It is also desired to provide a universal milling cutter, that is, a milling cutter which can be used on electrodes of any shape for both hand welding guns and robotized guns and which can perform complete or only lateral dressing of the electrode, according to the user's needs. Another object is always to produce a convex surface of the electrode "lens" to ensure maximum pressure on the sheet metal on the central axis of the "lens" where the fusion process must start.

BRIEF DESCRIPTION OF THE DRAWINGS

The features and the advantages of the invention will become clear from the detailed description of some preferred but non-limiting embodiments thereof; reference is made to the appended drawings, in which.

DETAILED DESCRIPTION OF THE PREFERRED EMBODIMENTS

Figure 1:
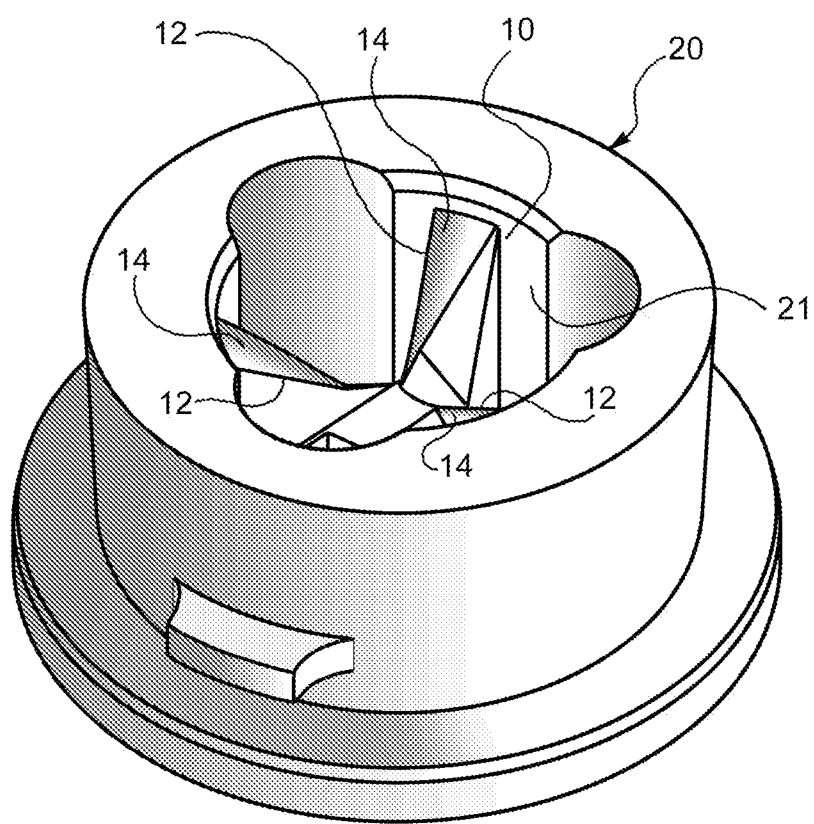
FIG. 1 is a perspective view of a first embodiment of a milling cutter according to the invention, mounted in a tool-holder.
Figures 2, 2A, 2B:
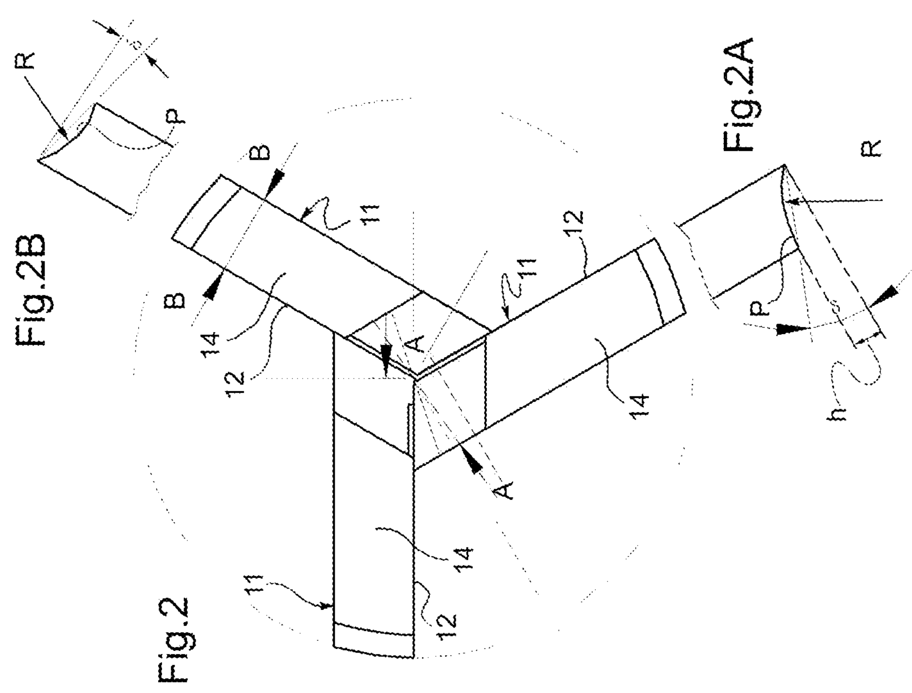
FIG. 2 is a schematic view showing the milling cutter of FIG. 1 from above.
FIGS. 2A and 2B are sections taken on the lines A-A and B-B of FIG. 2.
Figure 3:
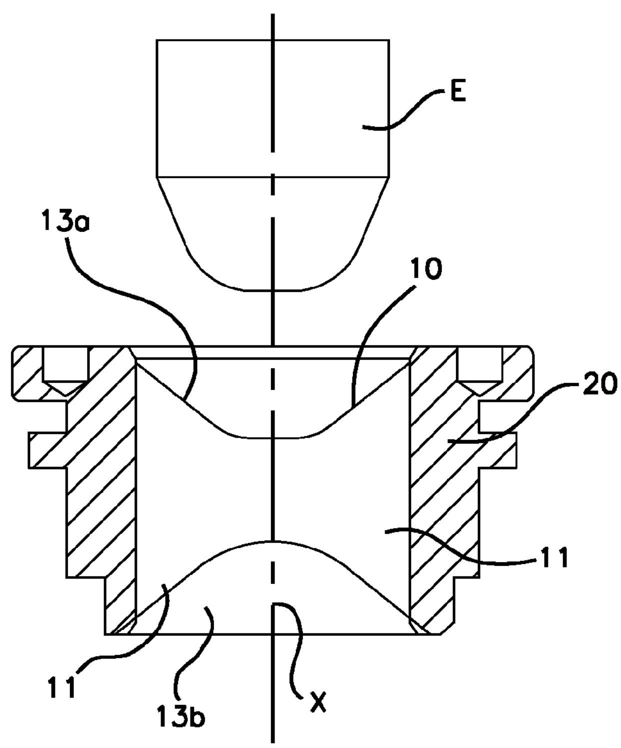
FIG. 3 is an axial section through the milling cutter of FIG. 1 and an electrode.

With reference initially to FIGS. 1-3, a milling cutter according to the invention, generally indicated 10, is fixed in a tool-holder 20 which, in this example, is shaped as a bush with a cylindrical inner surface 21.

The milling cutter 10 comprises a plurality of blades 11; in the preferred embodiment, there are three blades 11 projecting radially outwards from a longitudinal central axis x of the milling cutter. The blades have cutting edges 12 which are spaced angularly at regular intervals about the axis x and cooperate, during the rotation of the milling cutter about the axis x, so as to define two opposed, domed recesses 13*a*, 13*b* each suitable for receiving the end of a respective electrode E to be dressed. Only one electrode is shown in FIG. 3.

The milling cutters shown in the appended drawings are arranged for operating on two electrodes simultaneously and have a symmetrical structure. The following description will therefore be given almost exclusively with reference to one of the two symmetrical portions of the structure, upon the understanding that the portion that is not described should be considered identical or substantially identical to that described. The selection to produce a biconcave milling cutter which can operate on electrodes simultaneously, as well as the use of a symmetrical structure, constitute choices that are preferred in some situations of use but are certainly not essential for the purposes of implementating the invention. In particular, the milling cutter may be constructed in the form of a milling cutter that can operate on only one electrode or with a structure other than a symmetrical structure.

According to the invention, the blades have rear faces 14 with concave profiles as shown schematically in the sections of FIGS. 2A and 2B which are taken in section planes parallel to the axis x and perpendicular to the respective cutting edges. The radius of curvature R which determines the degree of concavity of the rear faces 14 is selected such that the axial relief S decreases progressively with the distance from the cutting edge. The portion P of the rear face 14 that is referred to herein as the back portion, with reference to the direction of movement of the cutting edge when the milling cutter is in use, constitutes a bearing surface which acts against the surface of the electrode and consequently limits the penetration of the cutting edge. In other words, the concavity of the rear face 14 determines the thickness of the shaving, if the pressure exerted by the gun and the hardness of the electrode are left out of consideration.

The depth h of the cutting edge and the radius R of the rear face 14 can be selected according to the thickness to be removed. The depth and/or the radius may also vary along the same blade in order to perform removals that are differentiated between the central zone and the lateral or peripheral zone of the cutting edge.

In the embodiment shown in FIGS. 1-3, the milling cutter 10 is a so-called "integral" milling cutter constituted by a single piece of hard metal which is produced by machining under numerical control to determine precisely the geometrical shapes of its surfaces. For an integral milling cutter of this type, it is preferred to fix it in the cylindrical surface 21 of the tool-holder 20 by braze welding, by hot mechanical interference, or by mechanical fixing.

Figure 4:
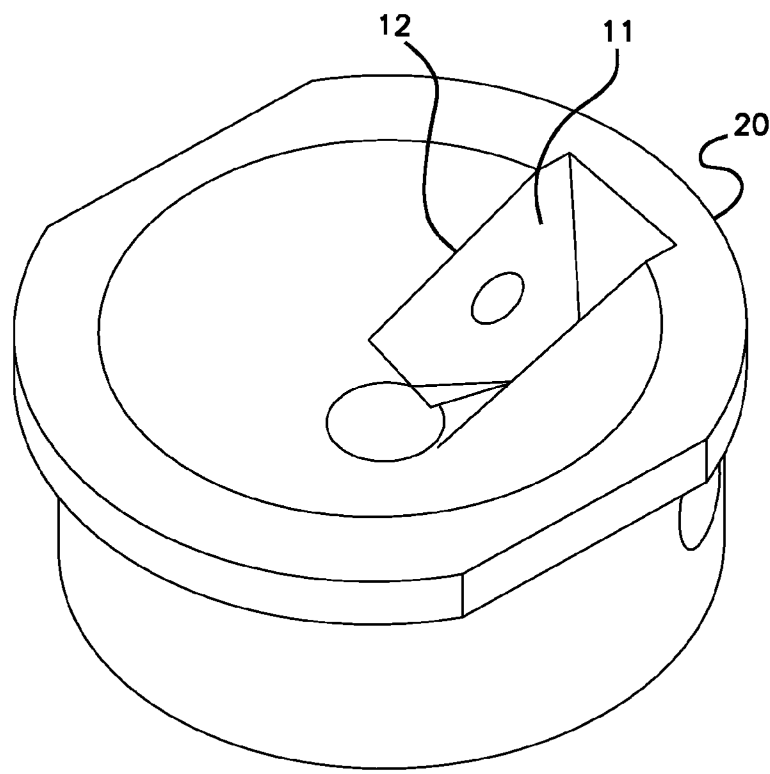
FIG. 4 is a perspective view of a second embodiment of the milling cutter according to the invention.

As an alternative to integral milling cutters, the cutting edges may be formed by individual elements that are fixed to the tool-holder mechanically by known methods. FIG. 4 shows a second embodiment of a milling cutter according to the invention having a single cutting edge 12 formed by a blade or plate 11 fixed mechanically to a bush-like tool-holder 20.

Figure 5:
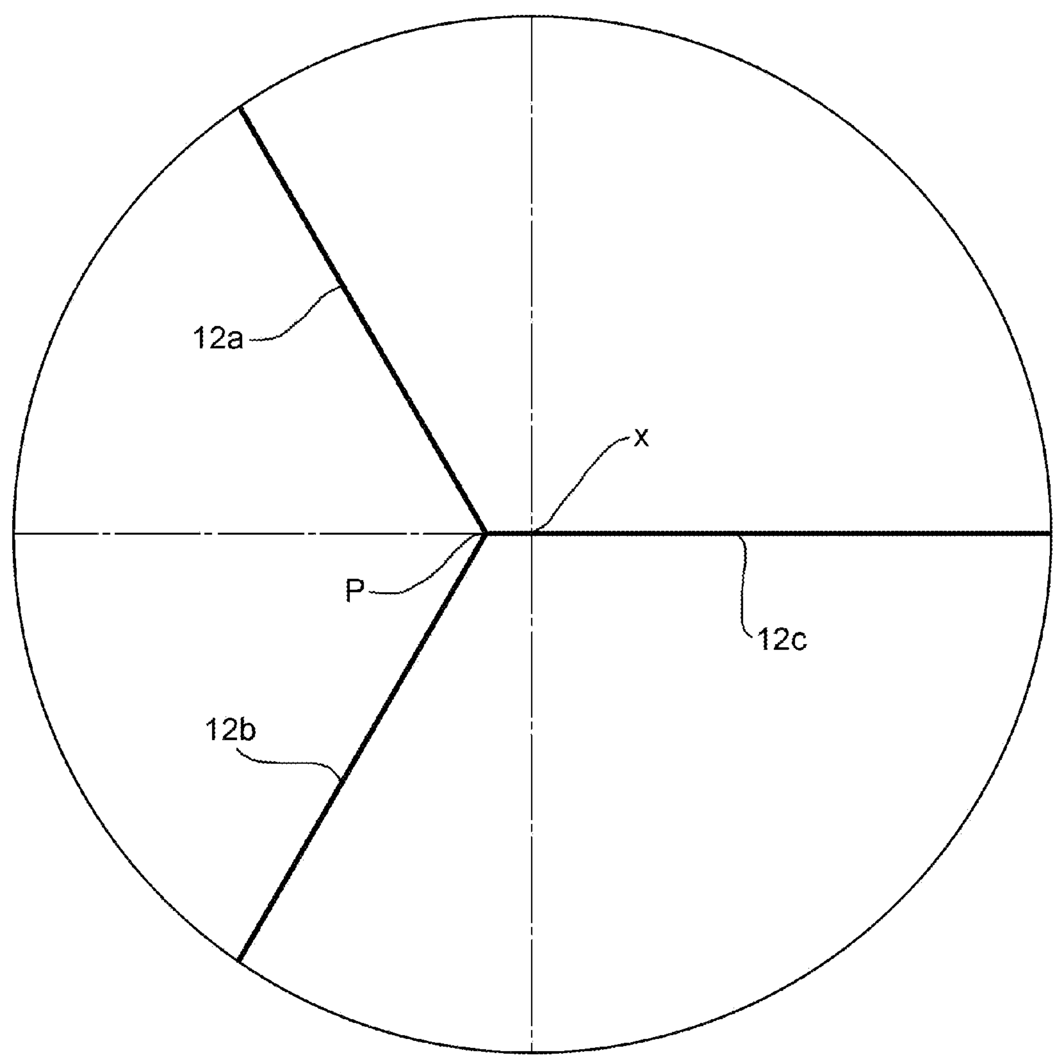
FIG. 5 is a schematic plan view of the configuration of the cutting edges in a further variant of the milling cutter according to the invention.

FIG. 5 shows schematically the configuration of the cutting edges of a further variant of the invention which differs from those described above solely in the configuration of the cutting edges in the central zone, which are redesigned to ensure particularly marked dressing at the apex of the electrode. It will be noted that, in the embodiment of FIG. 2, all three cutting edges 12 lie in respective axial planes, that is, planes extending through the central and longitudinal axis of rotation x of the milling cutter. According to the variant of FIG. 5, the three cutting edges 12*a*, 12*b* and 12*c* converge at a point P which is eccentric with respect to the central axis x. The only cutting edge that is contained in an axial plane is the cutting edge 12*c*; this cutting edge, which is slightly longer than the other two, extends beyond the axis x, intersecting it. During rotation about the axis x, the cutting edge 12*c* therefore describes a cutting surface which will also remove a thin layer of copper from the apex of the electrode.

As will be appreciated, the milling cutter according to the invention is universal and is not sensitive to variations in the metallographic characteristics of the electrode or in the pressures exerted by the welding gun. The milling cutter enables the removal of the material to be controlled and programmed; the useful life of the electrode can be predetermined and is in any case lengthened. Improved quality of the spot welds is also obtained, together with a considerable reduction in energy consumption.

The selection of milling cutters with rear faces of appropriate concave profile enables different quantities of material to be removed and different electrode geometries to be obtained, according to the use of the electrodes on welding lines, optimizing the technological welding parameters of the plants.

Although some preferred embodiments of the invention have been described with reference to the appended drawings, this description is intended purely for illustrative and non-limiting purposes and the invention may be subject to numerous variations with regard to shape, size, arrangements of parts, and constructional and functional details.

The invention claimed is:

1. A milling cutter for dressing resistance welding electrodes, comprising:

a plurality of blades having respective cutting edges and respective rear faces, the cutting edges extending outwards in substantially radial directions from a point in the vicinity of a longitudinal central axis of the milling cutter so as to create, during the rotation of the milling cutter about the axis, at least one concave surface or recess for receiving an end of an electrode, the rear face of each blade having a concave profile in a section plane perpendicular to the direction in which the respective cutting edge extends, the cutting edges converging at a point which is eccentric with respect to the central axis, wherein at least one of the cutting edges intersects the central axis.

2. A milling cutter according to claim 1, the plurality of blades having respective cutting edges being spaced angularly about the axis and which cooperate, during rotation about the axis, to define two opposed domed recesses, each suitable for receiving the end of a respective electrode of a welding gun, the concave profile of the rear face of each blade being in a section plane perpendicular to the respective cutting edge.

3. A milling cutter according to claim 1, wherein the concavity of each rear face is selected such that the axial relief decreases progressively with the distance from the cutting edge.

4. A milling cutter according to claim 1, wherein the rear face has a back portion oriented in a manner to comprise a bearing surface suitable for acting against the surface of the electrode to limit the penetration of the cutting edge into the electrode.

5. A milling cutter according to claim 1, wherein the blades are formed integrally from a single piece of hard metal.

6. A milling cutter according to claim 5, wherein the cutter is fixed in a substantially cylindrical surface of a tool-holder by braze welding, or by hot mechanical interference or mechanical fixing.

* * * * *